Dec. 28, 1954  YAO TZU LI  2,698,371
ELECTRIC STRAIN GAUGE
Filed Sept. 9, 1952

*INVENTOR.*
YAO TZU LI
BY Kenway, Jenney
Witter & Hildreth
ATTORNEYS

United States Patent Office 2,698,371
Patented Dec. 28, 1954

2,698,371

ELECTRIC STRAIN GAUGE

Yao Tzu Li, Watertown, Mass.

Application September 9, 1952, Serial No. 308,573

7 Claims. (Cl. 201—63)

This invention relates to a force transducer of the strain gage type with particular regard to a structure employing strain wires to measure force and quantities related to force, including acceleration and pressure, as well as compressive and tensile loads, by measuring and/or recording variations in resistance produced in a wire of known electrical characteristics by its variations in length.

It is well known that when strain-sensitive wire is subjected to a force or forces which effect a change in dimension and tensile stress in the body of the wire, the wire undergoes a change in resistance, which by suitable electrical connection is translatable into comparative measurements. Such gages may be of the so-called "bonded" or "unbonded" type.

The present invention is of the general unbonded type, in which the wire is unsupported, except at intervals. In unbonded gages, as commonly used, the basic elements involve the combination of a movable armature and a fixed frame, each constituting an anchor point for the strain gage wire. The movable armature, serving as an anchor point for one end of the strain assembly, has a degree of movement relative to the frame which anchors the other end of the strain assembly. In operation the armature is actuated in some manner by the quantity to be measured, with the resultant displacement occurring between the two anchoring members. The displacement serves to distend the strain sensitive elements tensioned between the members and effects an electrical change therein.

In the utilization of such an arrangement, certain inherent disadvantages are present. One disadvantage arises directly from the use of an armature. The armature is relatively much heavier than the strain-senstive elements, and therefore reduces the natural frequency of the system, the lower will be the frequencies at which it is possible to measure quantities like force and pressure. The existing types of gages are therefor not adaptable to measurements at high frequencies.

The disadvantages arise from the many parts in the unit, with the necessity of delicate adjustment, and from the fact that temperature changes cannot be satisfactorily compensated.

The chief object of the present invention is to provide an instrument which will avoid the disadvantages inherent in other instruments, which will be capable of operation at high frequencies, and which may be readily adapted to measurements of force and functions thereof, like pressure and acceleration, in a reliable and accurate manner, and over a wide range.

With this object in view, the principal feature of the invention comprises the combination of a flexible and elastic strain generating frame, and strain-sensitive elements, the frame offering support and activation to the strain elements mounted thereon. The strain-generating frame is preferably in the form of an open rectangle having flexible sides. The strain-sensitive elements are cross-wound in the open section of the rectangle. The effect of stress on the frame is to distort the frame both axially and perpendicularly with respect to the applied stress. The cross wound-strain gages mounted on the frame translate the frame distortions into electrical variations. Another feature is a compensating strain gage arrangement which eliminates the effects of changes in temperature.

Although the novel features which are believed to be characteristic of this invention will be particularly pointed out in the claims appended hereto, the mode of its operation and the manner of its organization may be better understood by referring to the following description taken in connection with the accompanying drawings forming a part thereof, in which Fig. 1 is an elevation view of the invention;

Figure 3:
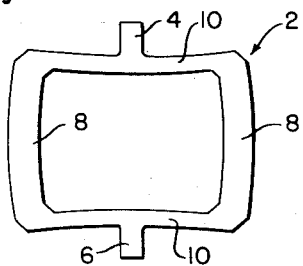
Fig. 3 is a diagram exaggerating the distortion under a compressive load.

Referring now to the drawings, illustrating one embodiment of the invention for measuring compressive or tensile loads, a rectangular open frame 2 constitutes the principal working element. The frame is made of an insulated metal, such as oxidized steel, and has two pairs of parallel sides 8 and 10. It is flexible in that a force applied between two sides distorts the frame, as shown in exaggerated fashion in Fig. 3. Integral with sides 10 are force transmitting rods 4 and 6 which are perpendicularly centered on parallel, opposed sides of the rectangular frame in a coaxial manner. If desired, the sides of the frame may be hollow in cross section, as shown for the sides 8 in Fig. 2, thereby reducing mass and making a system having a high-frequency response.

Figure 2:
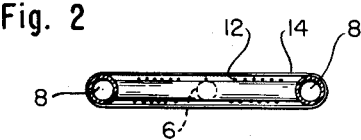
Fig. 2 is a cross section view along line 2—2 of Fig. 1.

A strain gage winding 12 is disposed transversely between the pair of parallel sides 10, and a second winding 14 is wound on sides 8, to form cross windings at right angles to each other. The windings are wound in loops equally spaced around the frame 2 under a predetermined initial tension which holds them securely to the frame. The cross windings avoid contact with each other by having the sides 8 larger in cross section than the sides 10, so that the winding 12 lies within the winding 14, as shown in Fig. 2. Since the frame is insulated, as heretofore noted, electrical contact is avoided between the elements of the system.

One end of the inner winding 12 is connected to one end of the outer winding 14 at a junction 16 suitably secured to the frame 2 as a terminal from which a lead may be taken. The other two ends of the two windings are separately but similarly fixed to the frame at terminals 18, 20. It will be understood that the terminals are mechanically secured to the frame but are insulated electrically therefrom.

Figure 1:
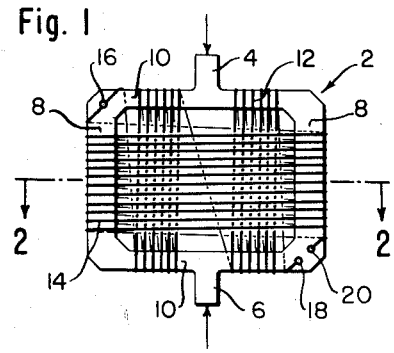

When a load is applied to the force transmitting rod 4, shown as a compressive load in the direction of the arrows in Fig. 1, the load is transmitted to the strain generating frame 2. This applied stress has the structural effect of developing an orbital movement about the corners. The sides 8 are distorted in sense mechanically opposite to the distortion of the sides 10, as shown in exaggerated fashion in Fig. 3, that is, one pair of sides is bowed outwardly and the other pair is bowed inwardly. One winding has its tension increased and therefore has its resistance increased, while the other winding has its tension reduced and therefore has its resistance reduced. These resistance changes are used to measure the compressive load, as will be hereinafter described.

Figure 4:
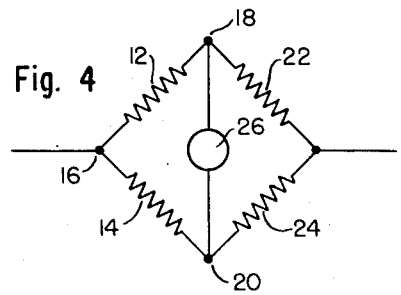
Fig. 4 is a diagram of the electrical circuit.

Fig. 4 shows the preferred form of electrical bridge circuit used to record changes in winding resistance. The windings 12 and 14 form two adjacent arms of a bridge. Resistors 22 and 24 form the third and fourth arms. A voltage source is connected to two diagonal corners, and a measuring instrument of any suitable form, shown diagrammatically at 26 is connected across the other two corners.

Figure 5:
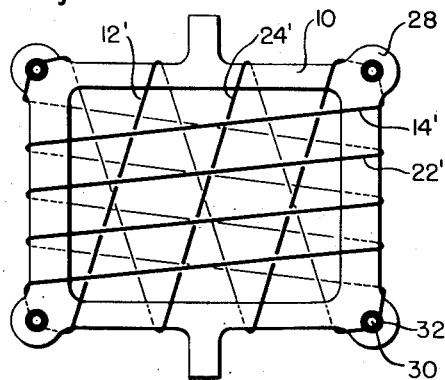
Fig. 5 is a view on an enlarged scale, showing modifications of the invention.

A modified form of unit is shown in Fig. 5. One modification consists in enlarging the corners, as shown at 28, thereby stiffening the corners and enhancing the distortion of one pair of sides as the other pair is distorted. The enlarged corners also afford simple terminal connections, some or all of the corners being provided with pins 30. Each pin is suitably insulated from the frame, as by a bushing shown at 32, whereby the ends of the windings may be soldered to appropriate pins, and the desired leads may likewise be connected thereto.

Fig. 5 also illustrated another modification, namely, the use of four strain gage windings, two on each pair of sides. The sides 10 have two separate windings 12' and 24', while the two sides 8 have the windings 14' and 22'. As shown in Fig. 5 each pair of windings is preferably arranged in the manner of a double pitch thread. The terminal connections are readily made in such a manner that the two windings on a single pair of sides form diagonal arms of the bridge; thus windings 12' and 24' on sides 10 take the place of arms 12 and 24 of Fig. 4, and windings 14' and 22' on sides 8 take the place of the arms 14 and 22 of Fig. 4. The entire bridge is therefore self-contained. (It will be understood that the turns of the windings in Fig. 5 are purposely shown widely spaced in order that their courses may be readily traced, but in practice the turns will be more closely spaced after the fashion of Fig. 1.)

From the above description, it will be seen that the present invention provides a simple, light, and compact unit, suitable for adapting to a variety of functions. Although the device may be made in any desired size, it has been found that a frame about one-half inch long is suitable for most purposes.

Figure 6:
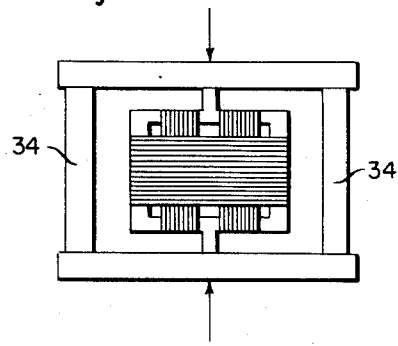
Fig. 6 is an elevation of a form of instrument embodying the invention.

The device can be connected in any place where direct compressive or tensile loads are to be measured. In cases of loads of large magnitude where it is not practical to have the instrument fully exposed to the load, the load may be divided among external elastic members, Fig. 6 shows elastic pillars 34 which are provided to share the load, in the direction of the arrow, and decrease the burden on the strain responsive unit.

As heretofore noted, the windings are wound with an initial tension, as will be understood by those skilled in the strain gage art. If insulated wire is used, the arms of the frame may be of the same size, since occasional contacts between the two windings are not usually detrimental, because of the very small motions of the wires under stress. However, the use of arms of different size, whereby contact between windings is fully avoided, as shown in Fig. 2, is preferred.

In accordance with the invention, therefore, there is provided a simple, light, and compact instrument. Because of its reduced mass, it has a high natural frequency and is therefore superior in measuring quantities varying at very high frequencies. Similarly, its simple and compact structure does not require the maintenance and periodic adjustment incident with the larger and more complicated instruments.

A still further feature of the invention is that changes in temperature of the strain gage windings have no effect on the readings. Because both windings substantially cover the same area and locus, they both have the same temperature; hence any temperature changes affect the resistance of the two windings equally. As a result, a temperature influence is equally shared by the two windings, resulting in no change of potential at the output terminal. The unit is therefore sensitive only to the actual strain, over a wide range of temperatures.

The above description has been with specific reference to specific forms of the invention. It is to be understood, however, that the invention is not limited to the construction herein shown and described. The principal feature is in the combination of a flexible strain generating frame and strain sensitive elements, the frame being subjected to transmitted loads which cause distortions of the frame in a directed manner. The distortions are converted to electrical variations by the strain elements which are cross wound to and supported by the frame.

Having thus described my invention, I claim:

1. A transducer comprising a loop of elastic material defining an internal open space, a winding of strain-sensitive wire having a plurality of substantially parallel turns lying across said open space, said turns being mechanically fixed by the loop and electrically insulated from one another, a second winding wound on the loop and having its turns substantially at right angles to the turns of the first winding, the turns of the two windings being under initial tension, whereby a force applied to the frame in a direction parallel to the turns of one winding increases the tension in one winding and reduces the tension in the other winding.

2. A transducer of the strain-gage type comprising a polygonal open frame having pairs of opposed sides, a strain-sensitive winding between one pair of opposed sides, a second strain-sensitive winding between another pair of opposed sides, said second winding being disposed at an angle from the first and said windings being unconnected with the frame in the space between said sides, and means for distorting the frame by a force applied to the frame perpendicular to one pair of opposed sides, whereby the tension is increased in one winding and reduced in the other.

3. A transducer of the strain-gage type comprising an open rectangular frame, a strain-sensitive winding between one pair of sides of the frame, a second strain-sensitive winding between the other pair of sides, said windings being disposed substantially at right angles to each other and unsupported in the open space enclosed within said sides, and means for distorting the frame by force applied to the frame perpendicular to one pair of sides.

4. A transducer comprising a closed loop of elastic material forming an open frame, the frame having stiffened portions at regularly disposed points, two strain-sensitive windings, each having a number of substantially parallel turns extending across the frame, the turns of the two windings being arranged substantially at right angles to one another, the windings being unsupported except at points of contact with the frame, said stiffened portions lying between the end portions of adjacent windings, whereby a force applied to the loop to stress one winding in one sense results in a stress on the other winding in the opposite sense.

5. A transducer comprising an open rectangular frame having elastic side members and stiffened corner portions, a strain-sensitive winding between one pair of sides of the frame, a second strain-sensitive winding between the other pair of sides, said winding being disposed substantially at right angles to one another and unsupported in the open space enclosed within said sides, and means for distorting the frame by force applied to the frame perpendicular to one pair of sides.

6. A transducer comprising an open frame member of elastic material having two pairs of parallel sides, two separate windings on said frame across one pair of parallel sides, two additional separate windings wound said frame across the second pair of parallel sides in a direction substantially perpendicular to said first two windings, and means connecting said windings to form the arms of an electrical bridge.

7. A transducer comprising an elastic frame having two pairs of parallel sides, one pair of sides being of greater cross-section than the other, a strain-sensitive winding under initial tension on one pair of sides, a second strain-senstive winding on the other pair of sides, said windings being disposed angularly with respect to one another at an angle equal to or greater than that between two non-parallel sides and said windings being unconnected with the frames except at points of contact with the sides, whereby a force applied to the frame perpendicular to one pair of sides decreases the tension in one winding and increases the tension in the other.

References Cited in the file of this patent

UNITED STATES PATENTS

| Number | Name | Date |
|---|---|---|
| 2,036,458 | Carlson | Apr. 7, 1936 |
| 2,429,087 | Aughtie et al. | Oct. 14, 1947 |